United States Patent [19]

Forsberg

[11] Patent Number: 5,047,997
[45] Date of Patent: Sep. 10, 1991

[54] SONAR PROJECTOR WITH LIQUID MASS LOADING FOR OPERATION AT LOWER FREQUENCY

[75] Inventor: Gerard K. Forsberg, Lauderdale Lakes, Fla.

[73] Assignee: Argotec, Inc., Ft. Lauderdale, Fla.

[21] Appl. No.: 554,401

[22] Filed: Jul. 19, 1990

Related U.S. Application Data

[60] Division of Ser. No. 395,981, Aug. 21, 1989, abandoned, which is a continuation-in-part of Ser. No. 263,729, Oct. 28, 1988, abandoned, which is a continuation of Ser. No. 86,696, Aug. 17, 1987, abandoned.

[51] Int. Cl.$^5$ .................................................. G01V 1/38
[52] U.S. Cl. .................................. 367/191; 277/81 R; 137/247
[58] Field of Search .............. 367/142, 143, 146, 154, 367/167, 168, 171, 172, 174, 175; 137/247–250; 277/81 R, 83, 84, 88, 89

[56] References Cited

U.S. PATENT DOCUMENTS

| | | | |
|---|---|---|---|
| 4,450,543 | 5/1984 | Neeley | 367/154 |
| 4,679,179 | 7/1987 | Lally | 367/162 |
| 4,949,319 | 8/1990 | Boeglin et al. | 367/154 |

Primary Examiner—Brian S. Steinberger

[57] ABSTRACT

A sonar projector having a pair of opposed oscillating pistons driven by an electromagnetic assembly is rendered capable of operating at reduced resonant frequency by providing liquid mass loading for the pistons. The mass loading is achieved by utilizing a structure which constricts a body of liquid on one side of the piston. The constricted liquid may be sea water or a liquid sealed within the body of the unit. In accordance with a further aspect of the invention, a seal assembly is provided for the moving pistons which not only provides a sealing function but which also acts to radially center the pistons and to provide an axially directed restoring force thereto during piston oscillation. The electromagnetic assembly, in accordance with still a further aspect of the invention, is formed with a permanent magnet structure arranged in a cylindrical configuration with the opposed pistons on opposite axial ends thereof to reduce magnetic leakage losses.

7 Claims, 5 Drawing Sheets

SONAR PROJECTOR WITH LIQUID MASS LOADING FOR OPERATION AT LOWER FREQUENCY

The application is a division of application Ser. No. 07/395,986, now abandoned, which filed 8/21/89 is a continuation-in-part of application Ser. No. 263,729 filed 10/28/88, now abandoned, which is, in turn, a continuation of application Ser. No. 086,696, filed 8/17/87 now abandoned.

BACKGROUND OF THE INVENTION

The present invention relates generally to sonar equipment for underwater generation of sound and more particularly to an electromagnetic sound transducer or projector including pressure compensation means. More specifically the invention is directed toward a soar projector having piston means for generating acoustic waves capable of operation at lower frequencies.

In the past, electrodynamic projectors were used principally as low frequency and broadband laboratory calibration units. They were notoriously large, inefficient and were unreliable in all but laboratory environments; hence they were not viable candidates for field applications. The recent introduction of rare earth magnetic materials has drastically changed the electrodynamic transduction concept in critical areas and has resulted in a new low frequency transducer design disclosed herein.

In 1980 a new material called Samarium Cobalt was introduced. The raw materials were costly. Samarium cobalt demonstrated energy products on the order of 18 MGOe and extremely high coercive force, which renders the material practically nondemagnetizable. In 1985, Neodymium-Iron-Boron, was introduced. Energy products of 35 MGOe are presently available. Coercive force is also extremely high.

It is known that all permanent magnet materials lose their magnetism at elevated temperatures. The Curie temperature is the point at which a material is no longer magnetic. In samarium cobalt this occurs at 600°-800° C. (1100°-1500° F.); in neodymium-iron-boron, at 310° C. (590° F.). Irreversible losses may also occur at lower temperatures. Guidelines recommend the following operating temperature limits for the two materials: samarium cobalt +250° C. (+480° F.), neodymium-iron-boron +150° C. (+300° F.).

To conserve the force available in previous moving-coil units, pistons were made as light as possible. Lightweight radiators, for a given amount of transducer compliance, exhibit relatively high resonant frequencies. Because moving coil transducers exhibit flat responses above their fundamental resonant frequency it is desireable to make that frequency as low as possible. Resonant frequency is proportional to the inverse square root of the product of piston suspension compliance and piston acoustic mass. Compliance at moderate to extreme depths is controlled by the volume of the air cavity (compliance chamber) contained within the transducer. Reduction of resonant frequency can be achieved by increasing the compliance chamber volume. This can easily control overall transducer volume at only moderately low frequencies. In a similar manner, resonant frequency can be reduced through an increase in effective piston mass. This increase can be effected with no appreciable increase in overall transducer volume, even at extremely low frequencies. Because transducer volume, rather than weight, is usually the constrained physical parameter in shipboard applications, the mass-loading approach is appropriate. Implementation of mass-loading prior to availability of new magnetic materials would have prohibitively affected transducer size and weight because of the enclosed magnet volume and iron pole piece volume necessary to produce enough force to drive the mass load.

However, despite the aforementioned considerations, it is nevertheless disadvantageous to attempt to reduce the resonant frequency of the projector by increasing the mass of the piston means by actually adding to the size and/or weight thereof. Such additional weight not only increases the overall weight of the device, which is undesirable, but it also increases the loading of the projector thereby requiring increased power supply. to reduce the resonant frequency of a sonar projector by increasing the mass loading of the piston means without actually increasing the weight or size thereof.

SUMMARY OF THE INVENTION

Briefly, the present invention may be described as a sonar projector capable of underwater operation to transmit sound energy at low frequency. The device of the present invention essentially comprises piston means which are mounted for oscillatory movement to generate sound energy, electromagnetic means for driving the piston means, compliant means comprising gas means on one side of the piston means, compensation means for maintaining a pressure of the gas means equal to ambient hydrostatic pressure when the projector is submerged, and means for providing liquid on a side of the piston means opposite said one side for effecting communication between the piston means and open sea water on the exterior of said projector whereby the sound energy generated by the oscillatory movement of the piston means may be propagated into the ambient environment. In accordance with the present invention there is provided adjacent the piston means, between the piston means and the ambient sea water, constriction means for constricting the liquid on the opposite side of the piston means. The constriction means essentially operates to cause the constricted liquid to add to the mass loading of the piston means without actually increasing the weight thereof thereby to reduce the resonant frequency of the transducer or projector without any increase in overall weight.

In one aspect of the invention the constricted liquid may consist of sea water which flows freely through the interior of the projector with the body or casing of the projector acting as the constriction means. In this embodiment, the projector casing is configured with one or more openings to permit easy access for the sea water into the interior of the device.

In an alternative embodiment of the invention, the liquid means is sealed within the projector casing and may consist of oil or other appropriate liquid. Resilient means are provided as part of the sealing structure through which the sound energy may be propagated to the external sea water.

In accordance with a further aspect of the invention, a novel configuration is provided for the piston means and a permanent magnet structure forming part of the electromagnetic means, whereby losses due to magnetic leakage are reduced or minimized. In this aspect of the invention, the permanent magnet structure is formed as a cylindrical array and the piston means comprise a pair of opposed pistons located on opposite axial ends of the cylindrical array. Energized coil means may thus be placed on both axial ends of the permanent magnet array to drive each piston thereby abbreviating losses from one end of the permanent magnet which would otherwise occur if only one piston was provided.

In another aspect of the invention novel sealing means are provided which not only operate to provide a sealing function, but which also simultaneously act to provide both a restoring force and an aligning function to the piston means.

The more detailed aspects of the present invention will be better understood by reference to the detailed description thereof which follows, taken in conjunction with the accompanying drawings.

DETAILED DESCRIPTION OF THE PREFERRED EMBODIMENT

Figure 1:
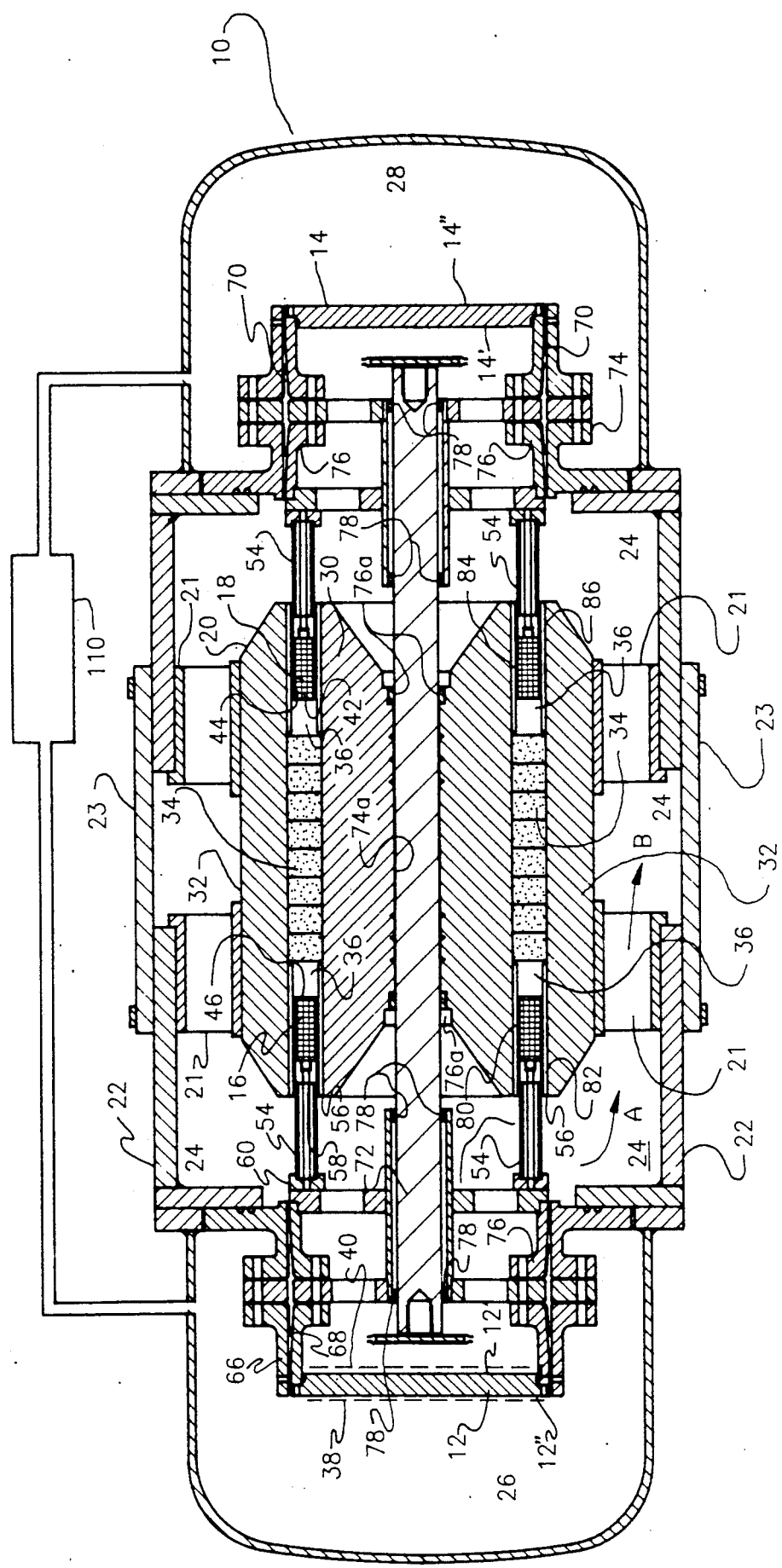
FIG. 1 is a longitudinal sectional view of an embodiment of the present invention.

Referring now to the drawings and particularly to FIG. 1 wherein there is depicted a first embodiment of the present invention, a sonar transducer or projector 10 is arranged with dual opposed pistons 12 and 14 connected to coils 16 and 18 that are driven by a cylindrically configured magnet assembly 20. The magnet assembly 20 is contained in and connected by a plurality of members 21 to a cylindrical transducer body 22. Acoustic energy produced by the moving pistons 12 and 14 is transferred to a booted midsection 23 of the transducer 10 via a liquid 24 surrounding the magnet assembly 20 and in contact with inner faces 12' and 14' of the pistons 12 and 14 respectively. Compliance chambers 26 and 28 are situated adjacent to piston external surfaces 12" and 14". A gas fills the compliance chambers 26 and 28. The placement shown is one of many possible configurations which can be implemented to suit a particular requirement.

In accordance with principles well known to those skilled in the art, the compliance chambers 26, 28 are provided with compliance means 110 which operate to maintain the pressure of the gas within the chambers 26, 28 equal to ambient hydrostatic pressure when the device is submerged. Since compliance means such as contemplated for use with the present invention are well known in the prior art, further detailed description thereof is deemed unnecessary to a complete understanding of the invention.

Figure 2:
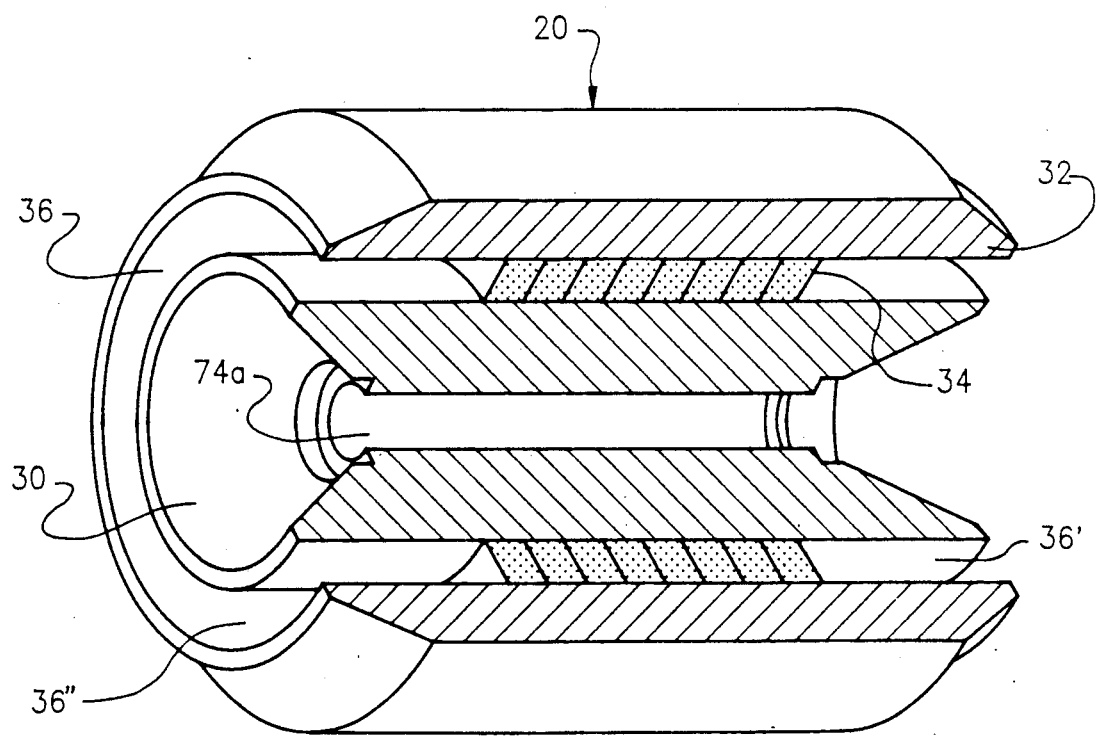
FIG. 2 is a view taken in perspective illustrating part of the magnetic assembly in accordance with the embodiment of FIG. 1.

The magnet assembly 20 of FIG. 1 is shown in greater detail in FIG. 2 and consists of an inner cylindrical pole piece 30 and an outer cylindrical pole piece 32 which define therebetween an annular air gap 36 within which a permanent magnet member 3 is located.

Inner pole piece 30 and outer pole piece 32 are made of low carbon steel or pure iron.

The permanent magnet member 34 consists preferably of neodymium-iron-boron material and is located between the inner pole piece 30 and outer pole piece 32 in the annular void or gap 36 between the two. The magnetic material occupies the center of the gap taken longitudinally of the assembly 20. Ends 36', 36" of the gap 36 are unoccupied by the permanent magnet member 34 and the moving coils 16 and 18 are situated one in each air gap end 36' and 36".

Magnetic flux flows from the permanent magnet material 34 in the magnet assembly 20 toward each end via the outer pole piece 32, across the air gap portions 36' and 36", and back through the inner pole piece 30.

The cylindrical or annular coils 16 and 18, shown in FIG. 1 in this transducer, travel axially in a reciprocating fashion within the air gap ends 36', 36" and drive the pistons 12, 14, whereby, for example, the piston 12 moves to the left and right as illustrated by dashed lines 38 and 40. Each coil 16 and 18 consists of a number of layers of copper wire 42 each of which is preferably square or rectangular in cross section. Between each layer is a film 44 of mylar. The entire package is bonded together with stretched monofilament nylon and the outer surfaces of the coils are coated with a thermally-conductive epoxy.

A layer of phenolic board 46 is attached at the inner free ends of the coils 16 and 18 to prevent damage. At the outer or attached ends of the coils 16 and 18, a one inch layer of phenolic is attached to the coils with epoxy and the nylon monofilament, which wraps around the coil phenolic sandwich. The sandwich may be attached to the piston 12 or 14 via twelve stainless steel tubes 54 arranged in a circular array and extending through annular cylindrical air gap ends 36' or 36". The coils 16 and 18 used in this transducer are shorter than the axial length dimension of the air gap ends 36' or 36" in the magnet assembly 20. As they move, the coils 16 and 18 are always fully within the main magnetic field of the magnet assembly 20.

Each of the coils 16, 18 together with the tubes 54 and associated parts form a coil assembly 56 which is attached to the piston 12 or 14 by twelve of the stainless steel tubes 54 which are secured by twelve tension bolts 58 located inside of each tube extending between the coils 16, 18 and piston skirts 60 formed on each of the pistons 12 and 14. Spaces between the tubes allow liquid 24 to flow from the space between the piston 12 or 14 and the magnet assembly 20 as shown by arrow A to the space surrounding the magnet assembly and back as shown by arrow B. This keeps the liquid entirely within the body 22 and within the volume bounded by pistons 12 and 14 and booted midsection 23. The liquid thus flows in contact with the electromagnetic coil 16, 18 thereby providing an efficient heat transfer medium to the ambient sea water.

Copper rings 80, 82, 84 and 86 are press fit into the inside and outside pole pieces of the magnet assembly. The rings act as single-turn secondary windings to transformers whose primary windings consist of the moving coils. The existence of shorted secondary windings tends to reduce the a-c impedance of the moving coil, thereby reducing the dissipation of power as heat in the pole pieces. In essence, the copper rings shield the coil from the highly resistive iron pole pieces.

Each piston 12 and 14 operates to receive energy from the coils 16, 18 by means of the connections to the coil assemblies 56 and to convert this energy to sound energy through its radiating surface, which faces into the liquid 24. Each piston assembly also includes a bearing and seal assembly 70 shown in FIG. 1 and in FIGS. 3A, 3B and 3C. Each piston rides on an alignment shaft 72, and the transducer body 22 has affixed thereto skirts 74 that define an inner a wall 66 on one side of the seal assemblies 70. Each piston 12, 14 has formed thereon skirts 76 which define an opposed inner wall 68 on the opposite sides of the seal assemblies 70.

The alignment system incorporated into the invention ensures that the motion of the piston 12 or 14 is straight and that the piston cannot skew or tilt on its axis. Any skewing would cause the coil assembly 16 or 18 to rub against the rings 80, 82, 84, 86. The stainless steel centering shaft 72 passes through and is rigidly attached (e.g. epoxied or press fit) to an axial hole 74a through the center of the inner pole piece 30. The shaft 72 is rigidly centered in the hole by means of split centering collars 76a press-fit into place. The pistons 12 and 14 contain TEFLON bearings 78 on which the shaft 72 rides. This bearing assembly is capable of supporting a high load, if required.

Figure 3A:
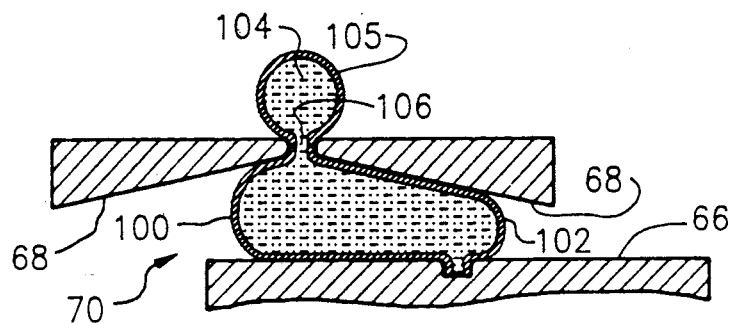
FIGS. 3A, 3B and 3C are each sectional views depicting the seal assembly of the invention with the piston means shown at three different location.
Figure 3B:
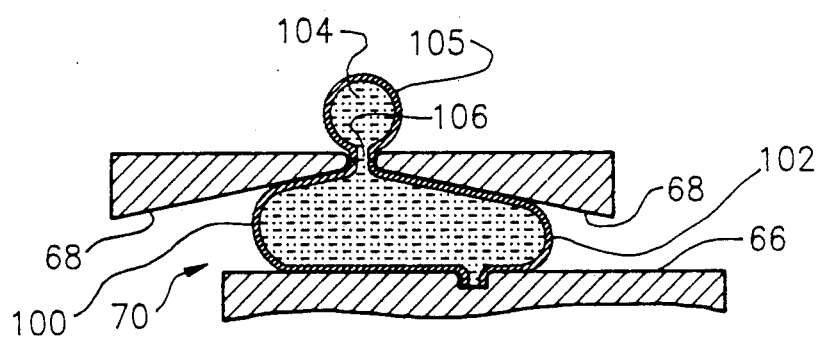
Figure 3C:
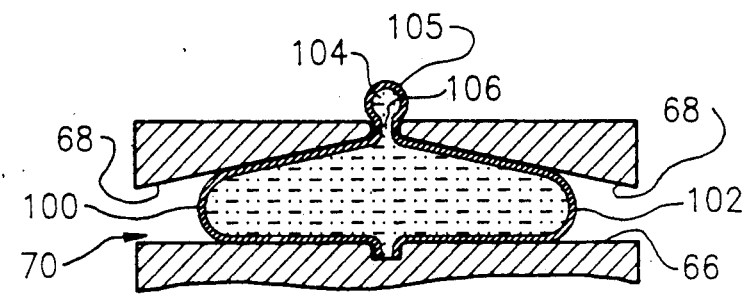

The primary purpose of the seal assemblies 70 is to separate the compliance chambers 26, 28 and the gas, such as air, contained therein from the interior portion of the transducer filled with the liquid 24. The seal assemblies 70 also serve to axially center each piston 12, 14 as shown by FIGS. 3A, 3B and 3C. That is, they exert a force to position the coils 16, 18 radially in the center of the annular air gap ends 36', 36'' of the magnet assembly. Movement to the right or left from the position shown in FIG. 3C increases pressure in the rolling seal.

Each seal assembly shown in FIGS. 3A, 3B and 3C consists of a seal member comprised of parts 100 and 102 that are made of elastomer-treated DACRON and contain a sealed pressurized liquid between them. The material of the parts 100, 102 of the seal members must be selected to be flexible but nonresilient. These seal members 100, 102 ride on tapered slightly conical piston skirt surfaces 68 as shown. The effect of the opposed conical walls 68 is to bring about an increasing volume to the contained liquid as the piston moves into a centered position shown in FIG. 3C. As the piston surfaces 68 move from the position of FIG. 3C, to the position shown in FIG. 3B or 3A, they operate to reduce the volume contained between the parts 100, 102 of the seal members by radially constricting a portion of the seal members 100, 102. Because the seal members 100, 102 are made of material which is not resilient or elastic, but which is flexible, the liquid is forced to flow through an orifice 106 into a separate seal compliance chamber 104 which is developed by the formation of a stabilization bubble 105 shown in FIG. 3B which determines the amount of restoring force imparted to the piston. Restricting the flow to the seal compliance chamber 104 adds damping to the piston motion. The material forming the bubble 105 is selected to be resilient or elastic and therefore the pressure within the chamber 105 is increased as the volume within the seal member 100, 102 is reduced thereby creating a pressure tending to force the liquid back into the seal member 100, 102 and simultaneously providing a restoring force to the pistons 12, 14.

The seal assembly 70 lends alignment and bearing to the piston motion. The seal assemblies 70 not only provide a sealing function between the chambers 26, 28 and the interior of the transducer containing the liquid 24, but they also operate to simultaneously provide a restoring force tending to return the pistons 12, 14 to the neutral position shown in FIG. 3C while also acting to center the pistons radially. This centering force occurs since the pressure of the contained liquid will tend to radially center the piston, adding additional alignment and dynamic bearing force. Thus, it may be possible to entirely eliminate the center shaft 72 and the bearing assemblies 78. Such an embodiment would utilize a magnet assembly wherein the inner pole piece 30 is formed as a solid member since no center axial hole 74a would be necessary.

It should be noted that the surfaces 66 and 68 between which the seal members 100, 102 are located and arranged to move axially relative to each other in opposed directions upon energization of the coils 16, 18. The stabilization bubble 150 essentially comprises reservoir means which receives liquid from the seal members 100, 102 when they are compressed between the opposed surfaces 66, 68. It will be noted that in the embodiment shown in FIGS. 3A, 3B and 3C, the opposed surfaces 68 are configured with a slanted configuration extending toward the surfaces 66 taken in a direction from the neutral position shown in FIG. 3C toward either of the two opposed directions of movement by the pistons.

The main compliance chambers 26, 28 are located at the extremities of the transducer body.

Each compliance chamber 26, 28 consists of a rigid steel or aluminum chamber filled with air that is pressurized to external hydrostatic pressure by the compliance or depth compensation means 110. The total compliance system, which includes the axial compliance of the rolling seal, determines the fundamental resonant frequency of the transducer.

Air at ambient hydrostatic pressure can be supplied to the compliance chamber 110 by air bladders contained within free flooding, rigid walled pressure vessels. The vinyl air bladders conform to the inside walls of the vessel when inflated, but totally collapse when exhausted. External hydrostatic pressure is permitted to enter one end of the pressure vessel through small freeflood holes. As depth and hydrostatic pressure increase, the bag collapses forcing air into the compliance chamber. By this means, the pressure in the compliance chamber remains equal to the hydrostatic pressure at the air bladder depth.

In most arrangements, the depth of the bladders and the compliance chambers will be the same. To minimize air bladder volume, the bladder can be designed to function only at the required operating depth range of the transducer. At shallower depths, the bladder is positively pressurized; at deeper depths, the air bladder is fully collapsed. At either of these extremes, the transducer and compliance chamber is subjected to differential pressures that are resisted by structural walls and seals. Such a compliance system is well known in the prior art and is not part of the present invention.

The configuration of the magnet assembly 20 shown in FIG. 1 is formed with the permanent magnet assembly 34 arranged as a cylindrical array and with the pistons 12, 14 arranged on opposite axial ends of this array.

The unit is effectively two magnet assemblies back-to-back hat, by design, provide mutual "bucking" of "back-end-leakage-flux". That is, if the magnet assembly were cut in half perpendicular to the axis, there would be extremely high leakage from the back end of each unit. Because the units are contiguous, each leakage field bucks the other, forcing the flux into the magnet air gap.. The back-to-back configuration also achieves a balance of the reactive forces developed by pushing against the piston load at each end. No net magnet acceleration or vibration will result if the two coils 16, 18 are opposed in the direction of motion and equal in force.

In the embodiment of FIG. 1 the liquid 24 is contained within the body of the projector 10 in a sealed condition and ambient sea water surrounding the unit is not permitted to flow into the interior of the device around the electromagnetic assembly 20.

Figure 1A:
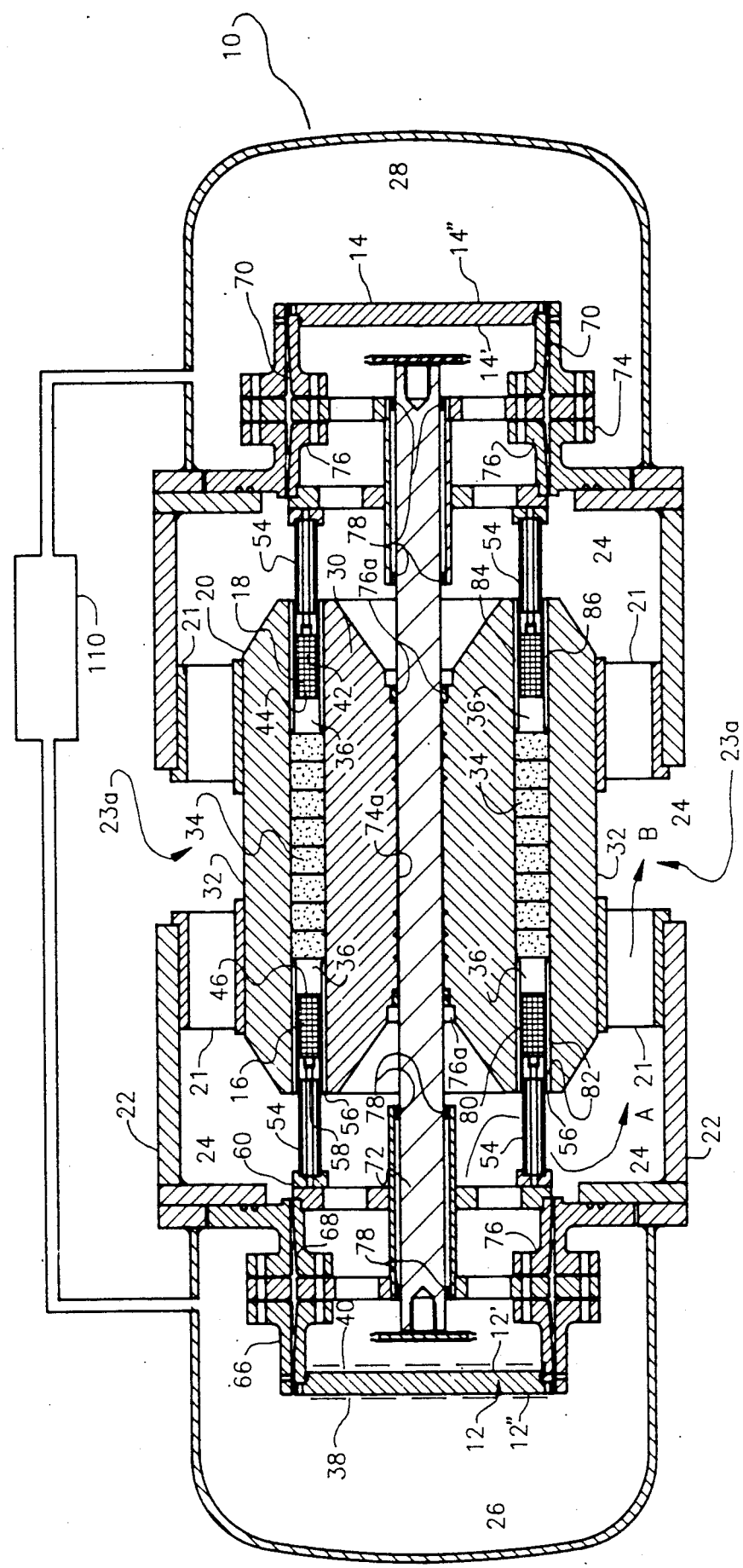
FIG. 1A is a longitudinal sectional view of another embodiment of the invention.

However, as will be apparent from the drawings, in the embodiment of FIG. 1A, the booted midsection 23 is eliminated and sea water is permitted to flow into the chamber through openings 23a to comprise the liquid 24. Thus, the essential difference between the embodiments of FIG. 1 and of FIG. 1A is that in FIG. 1 a contained body of liquid 24 other than sea water is provided while in FIG. 1A the booted midsection is removed and the chamber containing the liquid 24 is permitted to become flooded with sea water.

Referring first to FIG. 1, in the operation of the invention, when the pistons 12 and 14 are driven to oscillate by electrical activation of the coils 16 and 18 the movement of the pistons will generate sound energy which will be transmitted through the liquid 24 and through the booted midsection 23 out to the ambient sea water. The body of liquid 24 contained within the walls of the transducer body 22 will comprise a constrained body of liquid through which the acoustic energy is transmitted. Thus, between the inner walls 12' and 14' of the pistons and the exterior of the projector 10 there is provided a contained body of liquid 24 through which the acoustic energy must be transmitted. It will be understood that the exterior of the projector 10 commences or is located on the outer surface of the booted midsection 23.

This constrained body of liquid 24 acts to apply a mass loading to the pistons 12 and 14 thereby to decrease a resonant frequency of the pistons by this additional mass loading. As a result, the overall resonant frequency of the projector is reduced and this is accomplished without actually adding to the weight or the structure of the piston itself but merely by providing a constrained body of liquid adjacent to the piston through which the acoustic energy must be transmitted to reach the external sea water surrounding the projector 10.

In the embodiment of FIG. 1A, the constrained body of liquid is sea water which flows into the interior of the device. Again, oscillation of the pistons 12 and 14 will generate acoustic energy which, in order to be transmitted to the ambient sea water on the exterior of the projector 20, must be transmitted through the constrained body of sea water contained within the transducer body 22. Although this sea water may flow freely in and out of the transducer body 22, nevertheless the sea water which is contained within the walls of the transducer body 22 will be a constrained body of liquid as compared with free flowing sea water on the exterior of the transducer. Thus, again, this constrained body of sea water will act to apply a mass loading to the pistons 12 and 14 thereby enabling decrease in a resonant frequency of the projector.

Of course, a disadvantage of the embodiment of FIG. 1A as compared with the embodiment of FIG. 1 is that sea water is allowed to flow through and around the magnetic assembly 20. This of course increases corrosion effects but such effects can be overcome by periodic cleaning of the device, or minimized by the use of non-corrosive materials or coatings.

However, in accordance with a further aspect of the invention, the constrained body of liquid could be provided on the outer axial sides of the pistons 12, 14 with the same effect while eliminating the corrosion problems which might arise with the embodiment of FIG. 1A. This type of device is shown in FIG. 5.

Figure 5:
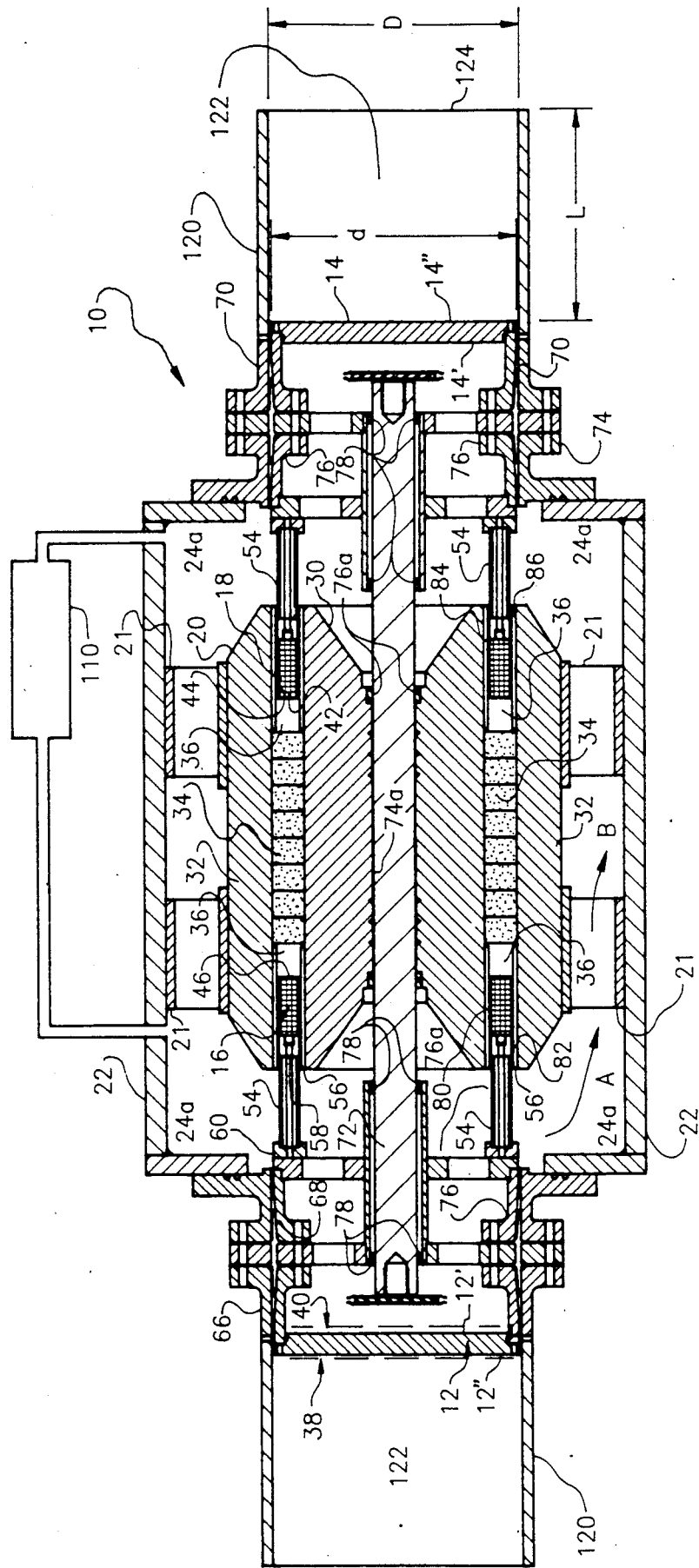
FIG. 5 is a longitudinal sectional view depicting a further embodiment of the invention.

In accordance with the embodiment of FIG. 5, the transducer body 22 is extended to completely enclose the openings 23a of FIG. 1A and the body of liquid 24 is eliminated and a gas 24a, such as air, is substituted. Of course, in this case, the compliant means 110 would now be connected with the interior of the body or casing 22.

In accordance with this embodiment of the invention, the constriction means may comprise a pair of cylindrical tubes 120 which may simply be formed as extensions of the skirts 74 of the transducer body 22. The tubes or extensions 120 are formed adjacent the pistons on sides 12", 14" thereof opposite the sides 12', 14' against which the gas 24a impinges and there will be defined within the confines of each of the extensions 120 a constrained body of sea water 122 which will operate to add mass loading to the pistons and thereby reduce the resonant frequency of the device in a manner similar to that effected by the liquid 24 in the embodiments of FIGS. 1 and 1A.

Figure 4:
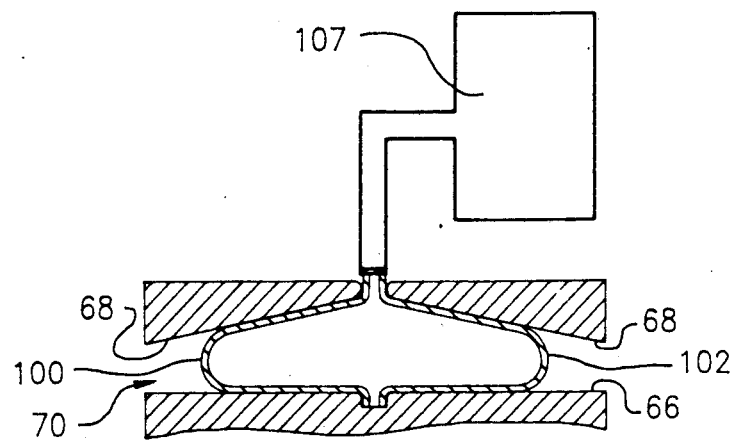
FIG. 4 is a perspective view depicting another embodiment of the seal assembly of the invention.

Another embodiment of the seal assembly of the invention is shown in FIG. 4. In this embodiment, a hydraulic accumulator 107 is provided and this accumulator operates to maintain a constant pressure within the seal member 100, 102 despite changing volume. Hydraulic accumulators of this type are well known in the art and a further detailed description thereof is not necessary to a complete understanding of the invention. It should merely be understood that as a result of the maintenance of constant pressure within the seal member 100, 102 linear operation of the seal assembly is effected thereby improving performance characteristics of the device.

The transducer fill-liquid 24 which is provided in the embodiment of FIG. 1 is selected to have low viscosity to minimize damping, high heat conductivity and low corrosive effect.

The alignment system of the invention comprises two elements: the centering shaft 72 and the rolling seal assembly 70. When configured as a totally fluid (neutral density) loaded system, it is conceivable that the seal assembly 70 alone may suffice as an alignment mechanism; not only for radial centering, but also for skew prevention. The seal also assists, and may conceivably suffice, in aligning the high density load configuration.

The transducer compliance system essentially consists of two components—the rolling seal centering force mechanism and the compliance chamber air volume. The centering force acts to hold the pistons in such a position as to center the moving coils 16, 18 axially in the magnet air gaps 36, 36'. This force is necessary to offset any build up of differential pressure between the transducer interior and exterior. The centering mechanism usually has a compliance which becomes negligible at greater depths where the density of the contained air is high.

Essentially, the depth compensation system supplies air to the compliance chambers 26, 28 at ambient hydrostatic pressure to ensure minimal static differential force on the piston.

A well proven, highly reliable system is the air bladder. The system consists simply of a flexible bag of air located at the same depth as the transducer. The air bladder is usually contained in a rigid canister that free-floods through an orifice(s) large enough to handle the flow of water required to equalize the bladder pressure with changing depth (static pressure), but small enough to retard alternating flow driven by acoustic pressure changes (dynamic pressure). As a result, the bladder does not provide a pressure release mechanism to the acoustic field.

The principal disadvantage of the air bladder system is size. The bladder must be larger than the compliance chamber by a factor equal to the number of atmospheres of pressure at maximum operating depth, minus one. For example, the air bag required to compensate a one cubic foot compliance chamber to a depth of 330 feet would need to be 10 cubic feet—probably much larger than the entire transducer. A reduction in size can be achieved if the transducer is not required to operate over its entire depth range. By pressurizing the bladder to begin equalization at some minimum operating depth, bladder size must be equivalent to the ratio of the absolute pressures at minimum and maximum operating depths, minus one, times compliance chamber volume. For example, a unit required to operate between 300 and 600 feet would be approximately the same size as the compliance chamber. (It would actually be smaller because the absolute pressure at any depth includes atmospheric pressure.) When using this method the transducer must be capable of surviving the extremes of differential pressure with no damage; further, operation is limited to the compensated depth range.

Ideally, air (or other gas) at ambient hydrostatic pressure would be supplied to the transducer from an external source, minimizing required transducer volume.

It should be understood, however, that the compliance system may be provided in accordance with the prior art and that many known systems would operate effectively in the present invention.

The present invention has been shown and described herein in what is considered to be the most practical and preferred embodiments. It is recognized, however, that departures may be made therefrom within the scope of the invention and that obvious modifications will occur to those skilled in the art.

What is claimed is:

1. A seal assembly interposed between a pair of concentric cylindrical members movable relative to each other comprising:

a pair of concentric cylindrical surfaces formed, respectively, on each of said movable members axially coextensive and radially spaced apart to define a cylindrical space therebetween, said opposed cylindrical surfaces being arranged to be displaced relative to each other axially in opposed directions from a neutral position;

a seal member affixed to both said movable members arranged within said space between said concentric surfaces, said seal member being formed of flexible nonresilient material defining a sealed enclosed volume having a liquid medium enclosed therein;

said concentric surfaces being configured to reduce the volume enclosed by said seal member therebetween when said surfaces are displaced axially relative to each other in said opposed directions while being maintained in concentric relationship;

said sealed volume including reservoir means for receiving liquid therein when said concentric surfaces are axially displaced from said neutral position and for returning said received liquid under pressure to said sealed volume when said opposed surfaces are returned to said neutral position after movement in either of said opposed directions.

2. A seal assembly according to claim 1 wherein said reservoir comprise a reservoir formed of resilient material arranged in flow means communication with said seal member to receive and return liquid from and to said seal member.

3. A seal assembly according to claim 1 wherein said reservoir means comprise hydraulic accumulator means operating to maintain constant pressure of said liquid in said seal member.

4. A seal assembly according to claim 1 wherein said reservoir means operate to apply a restoring force to said movable members tending to restore said movable members to said neutral position.

5. A seal assembly according to claim 1 wherein said opposed cylindrical surfaces are configured with a slanted configuration extending toward each other in a direction axially from said neutral position toward either of said opposed directions.

6. A seal assembly interposed between a pair of cylindrical members which are concentric to each other and movable relative to each other comprising:

a pair of opposed cylindrical surfaces formed, respectively, on each of said movable members defining a cylindrical space therebetween, said opposed cylindrical surfaces being arranged to be displaced relative to each other axially in opposed directions from a neutral position;

a seal member affixed to both said movable members arranged within said space between said opposed surfaces, said seal member being formed of flexible nonresilient material having a liquid medium enclosed therein;

said opposed surfaces being configured to reduce the volume enclosed by said seal member therebetween when said surfaces are displaced axially relative to each other in said opposed directions; and reservoir means for receiving liquid from seal member when said opposed surfaces are axially displaced from said neutral position and for returning said received liquid under pressure to said seal member when said opposed surfaces are returned to said neutral position after movement in either of said opposed directions;

wherein said reservoir means comprise hydraulic accumulator means operating to maintain constant pressure of said liquid in said seal member.

7. A seal assembly interposed between a pair of concentric cylindrical members movable relative to each other comprising:

a pair of concentric cylindrical surfaces formed, respectively, on each of said movable members defining a cylindrical space therebetween, said concentric cylindrical surfaces being axially coextensive and arranged to be displaced relative to each other axially in opposed directions from a neutral position;

a seal member affixed to both said movable members arranged within said space between said opposed surfaces, said seal member being formed of flexible nonresilient material shaped to define a sealed enclosed volume; and a liquid medium contained within said enclosed volume and substantially completely filling said volume;

said seal member being arranged between said concentric surfaces to provide a fluid seal between portions of said cylindrical space located on axially opposite sides of said seal member while enabling relative axial movement of said axially coextensive concentric surfaces in opposed directions from said neutral position.

* * * * *